(12) United States Patent
Hazanchuk et al.

(10) Patent No.: US 7,356,554 B1
(45) Date of Patent: *Apr. 8, 2008

(54) VARIABLE FIXED MULTIPLIERS USING MEMORY BLOCKS

(75) Inventors: Asher Hazanchuk, Sunnyvale, CA (US); Benjamin Esposito, Oviedo, FL (US)

(73) Assignee: Altera Corporation, San Jose, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 11/168,984

(22) Filed: Jun. 27, 2005

Related U.S. Application Data

(63) Continuation of application No. 10/668,449, filed on Sep. 22, 2003, now Pat. No. 6,943,579, which is a continuation-in-part of application No. 10/326,652, filed on Dec. 20, 2002, now Pat. No. 6,888,372.

(51) Int. Cl.
*G06F 7/42* (2006.01)
*H03K 19/177* (2006.01)

(52) U.S. Cl. .......... 708/625; 708/505; 708/670; 326/39; 326/40

(58) Field of Classification Search ............. 708/625
See application file for complete search history.

(56) References Cited

U.S. PATENT DOCUMENTS 5,117,385 A * 5/1992 Gee ................... 708/625

* cited by examiner

*Primary Examiner*—Vibol Tan
(74) *Attorney, Agent, or Firm*—Martine Penilla & Gencarella, LLP

(57) ABSTRACT

A programmable logic device includes at least one RAM block generating a first multi-bit calculation result which may, but does not necessarily, involve a multiplication of two operands. A shift operation is driven by a second multi-bit calculation result shifts the second multi-bit calculation result by at least one bit to generate a shifted second multi-bit calculation result. A multi-bit adder coupled to the at least one RAM block adds the shifted second multi-bit calculation result to the first multi-bit calculation result.

37 Claims, 8 Drawing Sheets

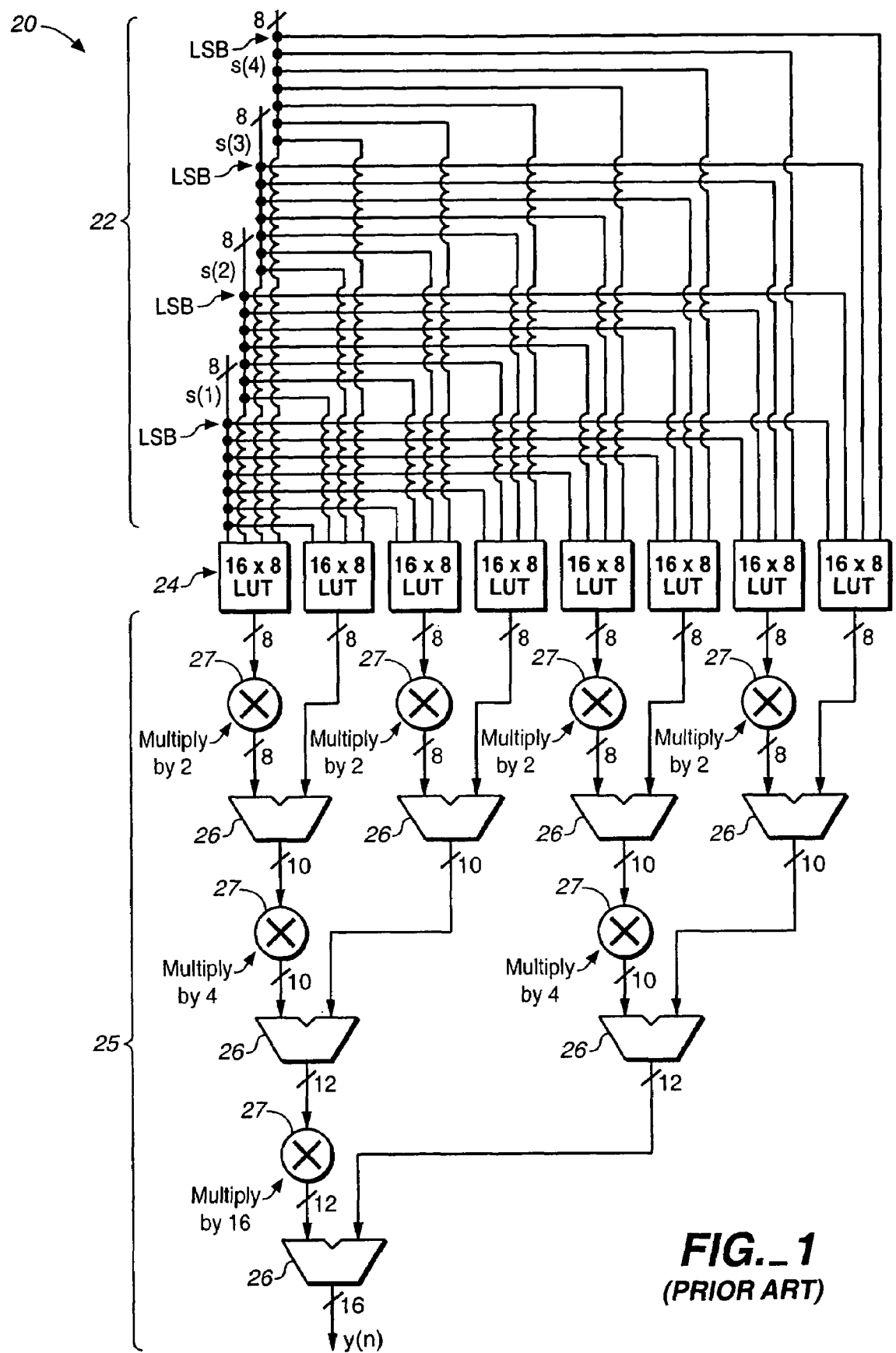
*FIG._1*
*(PRIOR ART)*

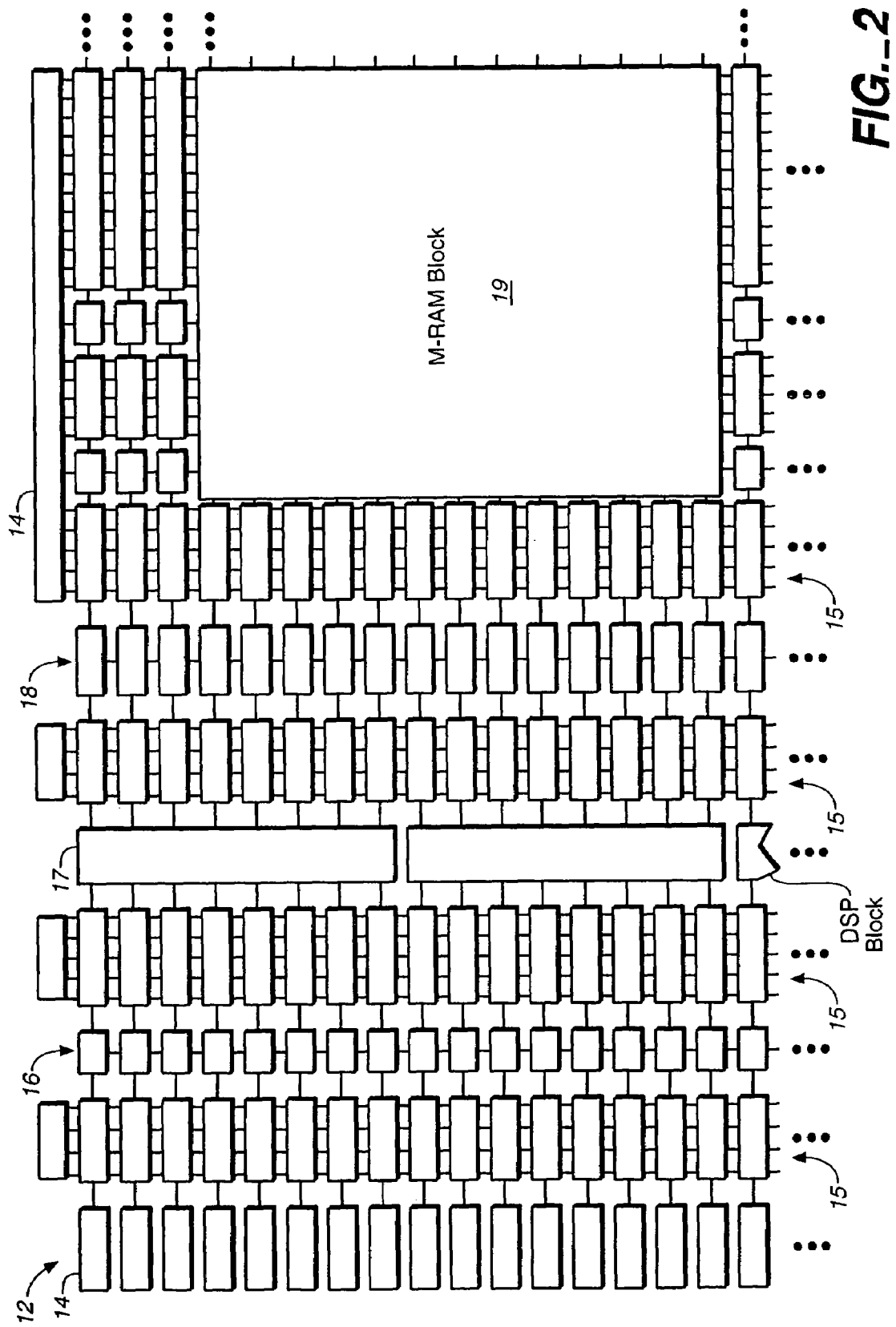
FIG._2

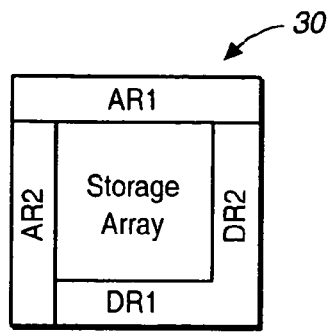
FIG._3
| RAM Block Contents | |
|---|---|
| Address | Storage Contents |
| 0000 | 0 |
| 0001 | C0 |
| 0010 | C1 |
| 0011 | C0+C1 |
| 0100 | C2 |
| 0101 | C2+C0 |
| 0110 | C2+C1 |
| 0111 | C2+C1+C0 |
| 1000 | C3 |
| 1001 | C3+C0 |
| 1010 | C3+C1 |
| 1011 | C3+C1+C0 |
| 1100 | C3+C2 |
| 1101 | C3+C2+C0 |
| 1110 | C3+C2+C1 |
| 1111 | C3+C2+C1+C0 |
FIG._5
TABLE I
| RAM Block Contents | |
|---|---|
| Address | Storage Contents |
| 0000 | 0 |
| 0001 | D0 |
| 0010 | D1 |
| 0011 | D0+D1 |
| 0100 | D2 |
| 0101 | D2+D0 |
| 0110 | D2+D1 |
| 0111 | D2+D1+D0 |
| 1000 | D3 |
| 1001 | D3+D0 |
| 1010 | D3+D1 |
| 1011 | D3+D1+D0 |
| 1100 | D3+D2 |
| 1101 | D3+D2+D0 |
| 1110 | D3+D2+D1 |
| 1111 | D3+D2+D1+D0 |
TABLE II
| RAM Block Contents | |
|---|---|
| Address | Storage Contents |
| 0000 | 0 |
| 0001 | F0 |
| 0010 | F1 |
| 0011 | F0+F1 |
| 0100 | F2 |
| 0101 | F2+F0 |
| 0110 | F2+F1 |
| 0111 | F2+F1+F0 |
| 1000 | F3 |
| 1001 | F3+F0 |
| 1010 | F3+F1 |
| 1011 | F3+F1+F0 |
| 1100 | F3+F2 |
| 1101 | F3+F2+F0 |
| 1110 | F3+F2+F1 |
| 1111 | F3+F2+F1+F0 |
FIG._6

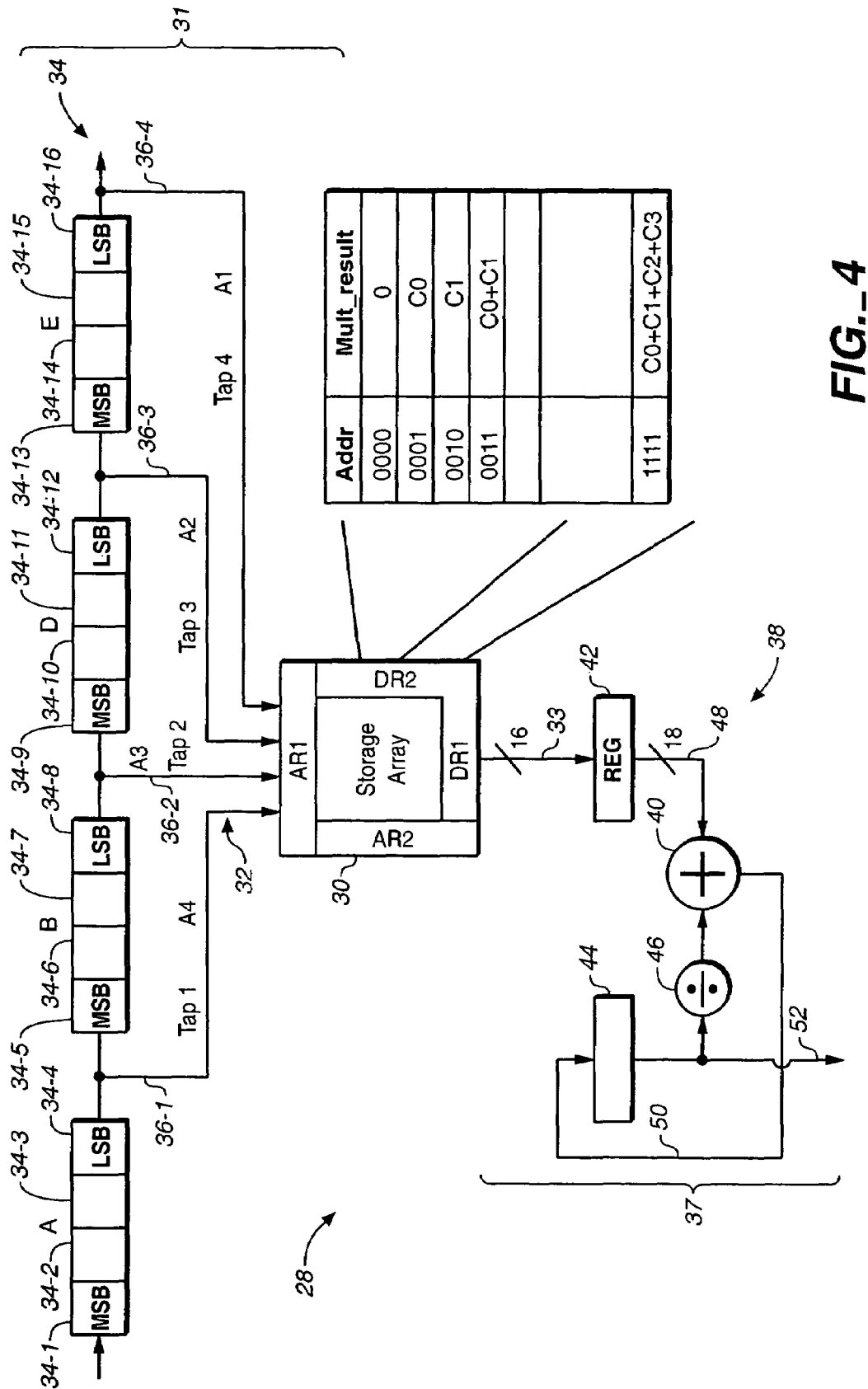
FIG._4

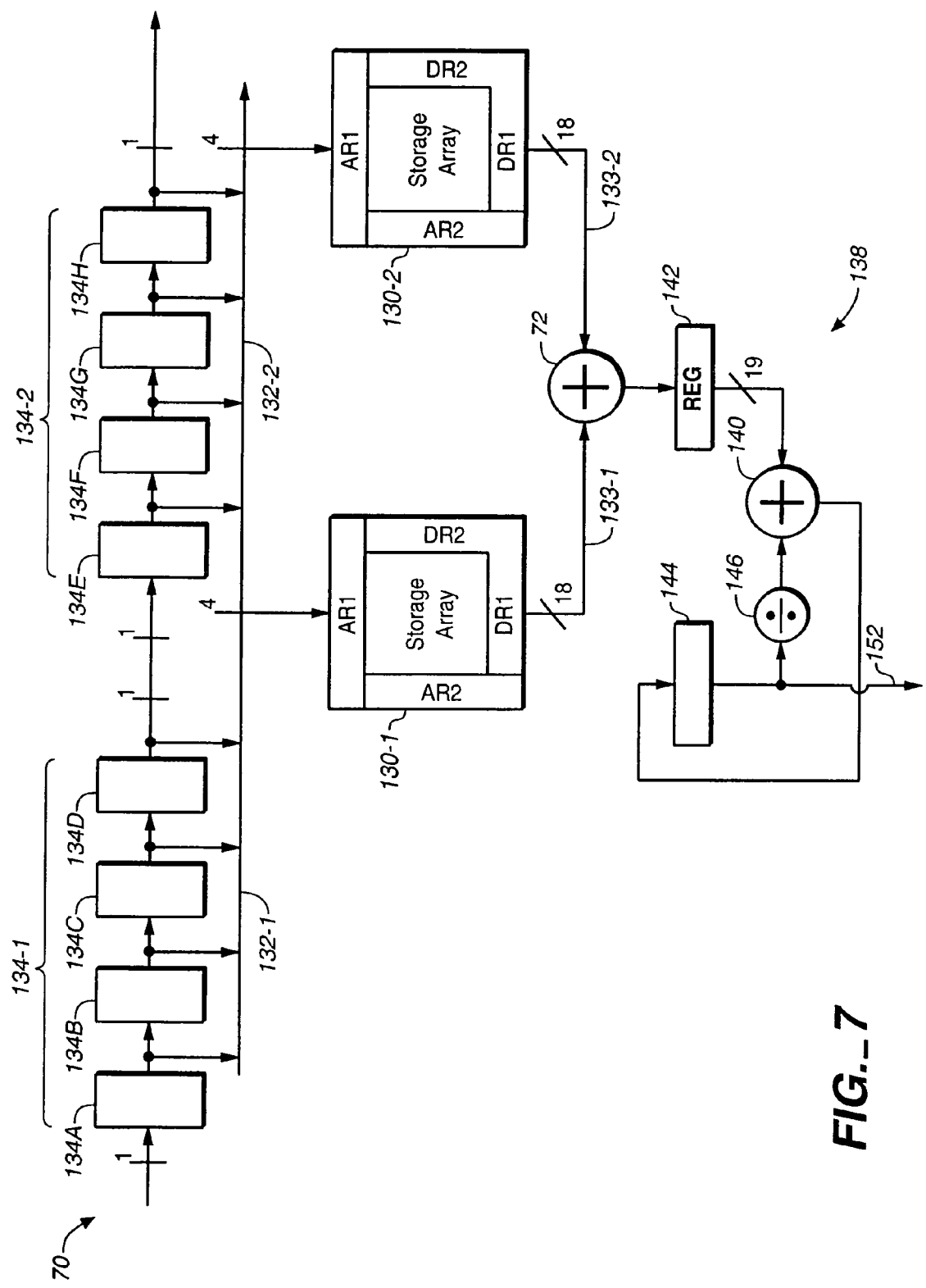
FIG._7

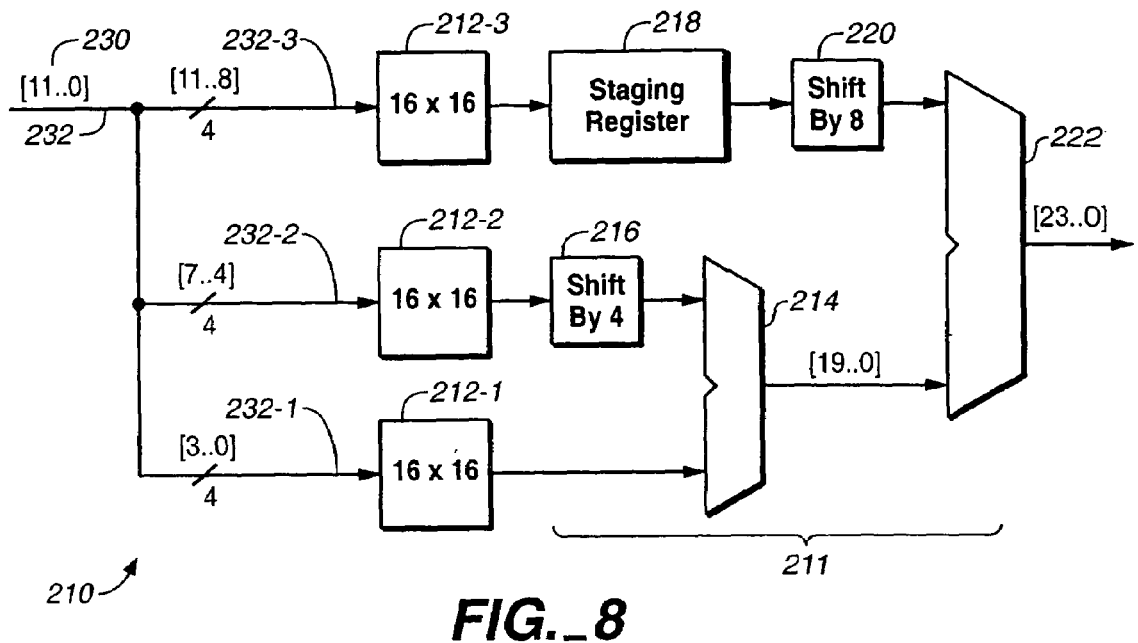
FIG._8
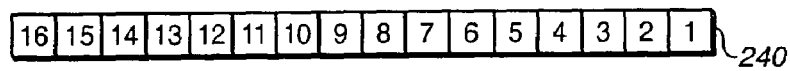
FIG._9
| Address | Multiplication Result |
|---------|----------------------|
| 0000 | 0 |
| 0001 | C |
| 0010 | 2C |
| 0011 | 3C |
| 0100 | 4C |
| ••• | ••• |
| 1111 | 15C |
FIG._10

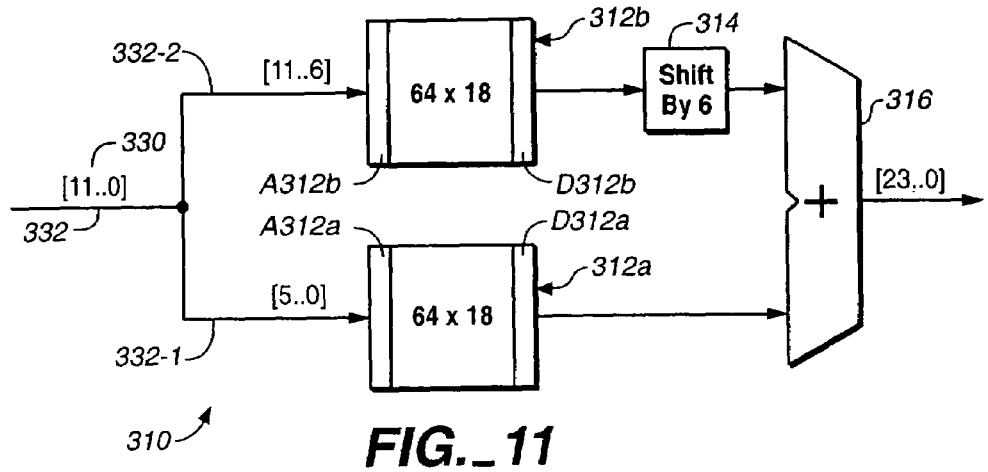
FIG._11
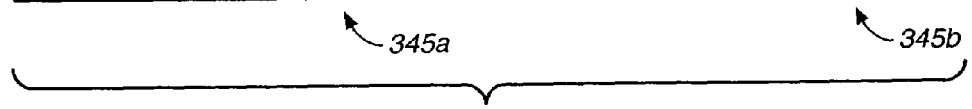
FIG._12
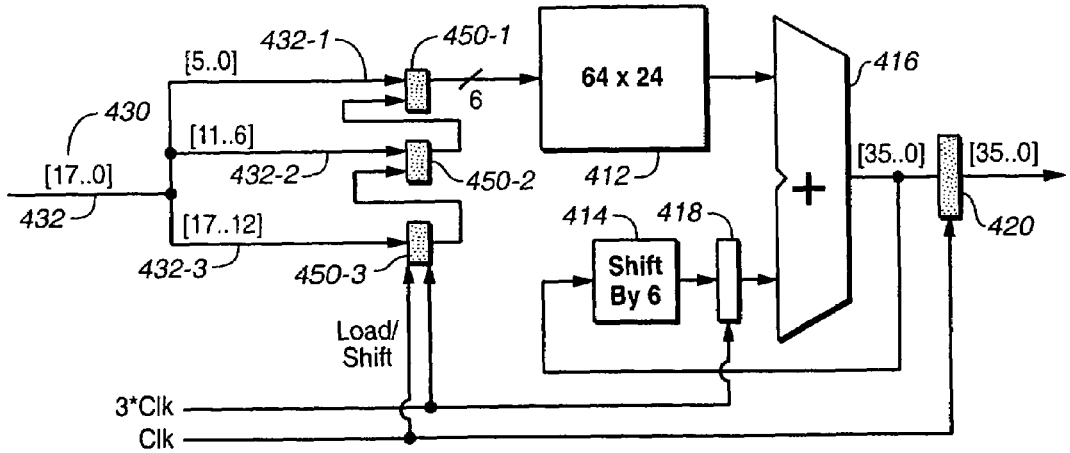
FIG._13

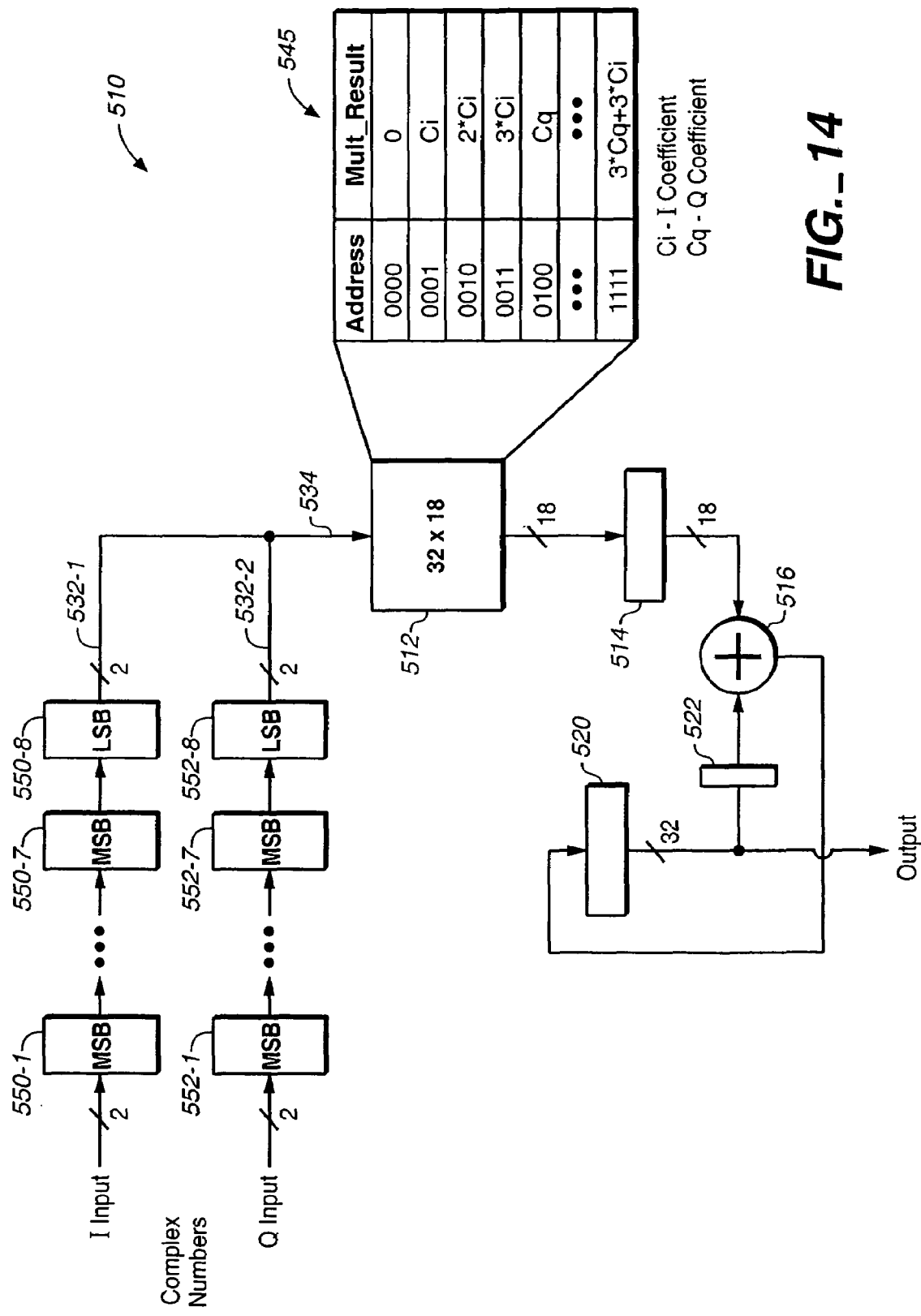
FIG._14

VARIABLE FIXED MULTIPLIERS USING MEMORY BLOCKS

PRIORITY INFORMATION

The present application is a continuation of U.S. patent application Ser. No. 10/668,449, filed on Sep. 22, 2003, now U.S. Pat. No. 6,943,579 which is a continuation-in-part of commonly owned U.S. patent application Ser. No. 10/326,652 for Programmable Logic Device with Soft Multiplier filed Dec. 20, 2002, now U.S. Pat. No. 6,888,372 both of which are incorporated in their entirety by reference.

BACKGROUND OF THE INVENTION

1. Field of the Invention

This invention relates to programmable logic devices (PLDs), and more particularly to implementing multipliers in PLD RAM blocks.

2. Description of the Related Art

A PLD is a digital, user-configurable integrated circuit used to implement a custom logic function. For the purposes of this description, the term PLD encompasses any digital logic circuit configured by an end-user, and includes a programmable array logic array ("PLA"), a field programmable gate array ("FPGA"), and an erasable complex PLD. The basic building block of a PLD is a logic element ("LE"). A LE is capable of performing limited logic functions on a number of input variables. Conventional PLDs combine together multiple LEs through an array of programmable interconnects to facilitate implementation of both simple and complex logic functions.

U.S. Pat. Nos. 5,550,782 and 6,249,143 and commonly assigned U.S. patent application Ser. No. 10/140,311, filed May 6, 2002, entitled, Multiple Size Memories in a Programmable Logic Device, now U.S. Pat. No. 7,720,796 which are expressly incorporated herein by this reference, disclose the distribution of both relatively large random access memory (RAM) blocks and numerous smaller RAM blocks throughout a single programmable logic device. For example, U.S. Pat. No. 6,249,143 discloses smaller RAM blocks associated with groupings of LEs called logic array blocks (LABs). Each LAB includes an identical collection of multiple LEs, programmable interconnect wires and a RAM block dedicated to the LAB. Each LAB includes a two dimensional array of programmable interconnect wires that can be programmed to interconnect the LEs and RAM block of a given LAB. That patent also shows a two dimensional array of programmable global interconnect wires that can be programmed to interconnect the LEs and RAM blocks of different LABs and that also can be programmed to interconnect the larger RAM blocks with different LABs.

Digital signal processing encompasses arithmetic-intensive techniques used in applications such as voice-over-IP (Internet Protocol), wireless base station with multi-channel links, adaptive elements (i.e. equalizers) and echo cancellation, to name just a few illustrative examples. Many systems use digital signal processing techniques to achieve signal filtering to remove unwanted noise, to provide spectral shaping, or to perform signal detection or analysis, for example. Two types of filters that provide these functions are finite impulse response (FIR) filters and infinite impulse response (IIR) filters. The FIR filters generally are used in systems that require linear phase and have an inherently stable structure. The IIR filters are generally used in systems that can tolerate phase distortion. Typical filter applications include signal preconditioning, band selection and low-pass filtering. For instance, the finite impulse response (FIR) filter is used in many digital signal processing systems to perform signal pre-conditioning, anti-aliasing, band selection, decimation/interpolation, low-pass filtering, and video convolution functions.

Multipliers are one of the building blocks of any DSP application. In the past, PLDs have implemented multipliers using look-up tables. For instance, FIG. 1 is an illustrative schematic drawing showing one example of an interconnection of numerous PLD logic elements to implement a vector multiplier 20 used in a 7-bit input FIR filter. An eighth bit comes from adding two 7-bit taps. The vector multiplier 20 includes a shift register 22, multiple look-up tables (LUTs) 24. It also includes multiply and accumulate (MAC) circuitry that comprises an adder tree 25 including individual adders 26 and scaling multipliers 27.

One problem with the example multiplier implementation shown in FIG. 1 is that it consumes significant PLD resources in that numerous LUTs 24 are used to implement a multiplier. Some DSP applications require numerous multipliers. Unfortunately, the resources used by each individual multiplier can reduce the number of multipliers that can be implemented in any given PLD chip. Thus, there has been a need for improvements in the implementation of multiplier functionality in PLDs.

Another problem with prior multipliers implemented in a PLD is that they sometimes have been inconvenient to re-program, especially on-the-fly. For instance, in some adaptive filter applications, there is a need to adapt (or modify), filter coefficients while a filter is operational. Thus, there has been a need an improved PLD-based multiplier that can be re-programmed more easily on-the-fly, for adaptive filter applications, for example.

The present invention meets these needs.

SUMMARY OF THE INVENTION

In one aspect of the invention, a programmable logic device includes at least one RAM block generating a first multi-bit calculation result which may, but does not necessarily, involve a multiplication of two operands. A shift operation is driven by a second multi-bit calculation result shifts the second multi-bit calculation result by at least one bit to generate a shifted second multi-bit calculation result. A multi-bit adder coupled to the at least one RAM block adds the shifted second multi-bit calculation result to the first multi-bit calculation result.

In another aspect of the invention, the at least one RAM block includes a first and second look up table ("LUT") the each generate a result that represents the multiplication of at least first and second multi-bit words, respectively, input into the at least one RAM block with a predetermined coefficient. The first and second multi-bit words are simultaneously input into the at least one RAM block and each represent a portion of a larger multi-bit word.

In another aspect of the invention, the at least one RAM block includes a first LUT and first and second multi-bit words are input serially into the at least one RAM block. The LUT generates a result that represents the multiplication of at least the first and second multi-bit words with a predetermined coefficient.

In another aspect of the present invention, the at least one RAM block includes a first LUT configured to generate an result representing a multiplication of a first portion of a multi-bit word input into the RAM block with a first coefficient summed with a multiplication of a second portion of the multi-bit word with a second coefficient.

BRIEF DESCRIPTION OF THE DRAWINGS

FIG. 1 is an illustrative schematic diagram showing one example of an earlier interconnection of numerous PLD look-up tables to implement a multiplier.

FIG. 2 is an illustrative diagram of a portion of a floor plan of a PLD 12 in accordance with one embodiment of the invention.

FIG. 3 is a simplified illustrative drawing of a dual port RAM block.

FIG. 4 is an illustrative drawing of a multiplier implemented in a PLD using the dual port RAM block of FIG. 3 in accordance with one embodiment of the invention.

FIG. 5 is an illustrative drawing of a look up table stored in the RAM block of the of FIG. 3 in accordance with one embodiment of the invention.

FIG. 6 is an illustrative drawing of first (Table I) and second (Table II) look up tables stored in the RAM block of FIG. 3 in accordance with another embodiment of the invention.

FIG. 7 is an illustrative drawing of a multiplier implemented in a PLD in which an evaluation result is derived through access to multiple multi-port RAM blocks of the type illustrated in FIG. 3 in accordance with another embodiment of the invention.

FIG. 8 is a block diagram illustrating a calculation circuit including multiple RAM blocks each for simultaneously carrying out a calculation on a portion of a multi-bit word in accordance with another embodiment of the invention.

FIG. 9 is an diagram illustrating the operation of a shift-by-4 operation shown in FIG. 8 in accordance with one embodiment of the invention.

FIG. 10 is a drawing of a look up table stored in the RAM blocks shown in FIG. 8 in accordance with one embodiment of the invention.

FIG. 11 is a block diagram illustrating a calculation circuit including a RAM block for simultaneously carrying out a calculation on two portions of a multi-bit word in accordance with another embodiment of the invention.

FIG. 12 is a drawing of first and second look up tables stored in the RAM block shown in FIG. 11 in accordance with one embodiment of the invention.

FIG. 13 is a block diagram illustrating a calculation circuit including a RAM block for serially carrying out a calculation of two or more portions of a multi-bit word in accordance with another aspect of the invention.

FIG. 14 is a block diagram illustrating a calculation circuit including a RAM block for serially carrying out a multiplication and summing operation on two or more portions of a multi-bit word in accordance with another aspect of the invention.

DETAILED DESCRIPTION OF THE PREFERRED EMBODIMENTS

In one aspect, the present invention provides improvements in the implementation of arithmetic operations, particularly multiplication operations in PLDs having RAM blocks. In a different aspect, the present invention provides improvements in re-programming multipliers in PLDs having RAM blocks. The following description is presented to enable any person skilled in the art to make and use the invention. The embodiments of the invention are described in the context of particular applications and their requirements. These descriptions of specific applications are provided only as examples. Various modifications to the preferred embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

FIG. 2 is an illustrative diagram of a portion of a floor plan of a PLD 12 in accordance with one embodiment of the invention. The portion in FIG. 2 is illustrative of a pattern that repeats throughout the chip. The PLD 12 includes an array of input/output elements (IOEs) 14, logic array blocks (LABs) 15, 32×18 bit RAM blocks 16, dedicated DSP blocks 17, 128×36 bit RAM blocks 18 and a 4K×144 bit RAM block 19. These components are interconnected by a programmable network of local and global interconnect circuitry.

One embodiment of the invention provides a programmable logic device in which programmable logic is programmed to use at least one RAM block to implement a 'soft multiplier.' As used herein, the term 'soft multiplier' indicates that it is possible to change the configuration or functionality of the multiplier by downloading new content into the RAM block. For example, by changing the content of a RAM block, its functionality might change from that of a 16×16 multiplier to that of a 20×16 multiplier. Alternatively, for example, by changing the content of the RAM block, its functionality might change from that of a multiplication mode to a sum of multiple multiplications mode.

The RAM block is encoded to operate as a look-up table multiplier that stores individual pre-computed values at individual storage locations. The individual values represent results of computations involving address values used to address the storage locations storing such individual values and at least one other value.

In one aspect of the invention, PLD resources are conserved by utilizing RAM block registers to implement a shift register functionality. One example of an advantage of this first aspect is that fewer LE resources are utilized to implement multiplier functionality. In another different aspect of the invention, a soft multiplier is reprogrammed on the fly. Basically, a multi-port RAM block is used to implement the soft multiplier. While one port actively retrieves previously stored data from a look-up table for use in a data processing function, for example, another port can simultaneously write new data to a look-up table to supplant the previously stored data. The new data can be used later to support the data processing functionality. One example of an advantage of this second aspect is that adaptive filtering can be more easily achieved since a set of current coefficients can be accessed through one RAM block port while an updated set of coefficients is input through another RAM block port. Coefficients can be updated without interrupting the filtering process.

FIG. 3 is a simplified illustrative drawing of a dual port RAM block 30. The RAM block 30 includes an array of multi-bit storage locations labeled 'Storage Array'. The RAM block 30 includes a first port with first address registers AR1 and a first data registers DR1. The RAM block 30 also includes a second port with a second address registers AR2 and second data registers DR2. The drawings of FIG. 3 show the address and data registers of a given port disposed on opposite sides of the RAM block. Although in actual practice, address and data registers of a given port generally are disposed on the same edge of a RAM block. The first and second ports are operable independently of each other in that they can simultaneously access individual storage locations of the storage array. During storage array access via the first port, an individual storage location is addressed by address signals provided to the first address registers AR1. If data is to be written to the addressed storage location, then data to be written is input to the storage location via the first data registers DR1. If data is to be read from the addressed storage location, then data retrieved from the addressed storage location is output via the first data registers DR1. The second port operates in an analogous manner. Individual storage locations of the storage array can be addressed via address signals provided to the second address registers AR2. Data to be written to or read from an addressed storage location via the second port are transferred through the second data registers DR2. Details of control signals used to control the read/write operations of the first and second ports are not described herein since these details will be readily understood by persons of ordinary skill in the art. It will be appreciated that, although the RAM block 30 of FIG. 3 is shown to include only a first and second ports, embodiments of the invention can be implemented using multi-port RAM blocks having more than two ports.

FIG. 4 is an illustrative drawing of a 4-tap filter 28 implemented using the multi-port RAM block 30 in accordance with an embodiment of the invention. First address registers AR1 of the RAM block 30 are coupled to a multi-bit address input 32 that provides signals to address individual storage locations. The first data registers DR1 of the RAM block 30 are coupled to provide a multi-bit data output 33 for conducting, signals representing data stored at storage locations addressed by address signals provided on the address input 32. First programmable logic circuitry 31 is programmed to operate as a shift register 34 that includes individual registers 34-1 to 34-16 interconnected as shown. The shift register 34 includes multiple tap outputs 36-1, 36-2, 36-3 and 36-4 coupled as shown to the multi-bit address input 32 of the RAM block 30. Second programmable logic circuitry 37 is programmed to serve as multiply and accumulate (MAC) circuitry 38. The MAC circuitry 38 operates as an accumulator that includes adder circuitry 40, a multi-bit input register 42 coupled to the multi-bit output 33 of the RAM block 30 and accumulator register 44 for storing accumulation results output by the adder 40. The MAC circuitry 38 also includes divider circuitry 46 used to scale the value stored in the accumulator register 44. Although the term 'multiply' is used to denote circuitry 38, it will be appreciated that the role of the multiply function is to scale the contents of accumulator register 44 relative to the contents of input register 42 prior to adding the values currently stored in the two registers. Persons skilled in the art will appreciate that this scaling can be achieved through a multiplication or a division operation. In fact, in the illustrated embodiment, the scaling operation is achieved using a divider circuit 46. Thus, the term 'MAC circuitry' encompasses implementations using scaling through multiplication or through division.

The divider 46 scales by dividing the accumulator contents by two. A multi-bit output 48 of the input register 42 is coupled to a first addend input of the adder 40. A multi-bit output of the divider circuitry is 46 coupled to a second addend input of the adder 40. A multi-bit sum output 50 of the adder 40 is coupled to provide an input to the accumulator register 44. A multi-bit output 52 of the accumulator register 44 is coupled to an input of the scaling divider 46 and also provides a multi-bit accumulator output 52.

A role of the scaling circuitry, divider 46 in the illustrated example, is to weight stored values retrieved from the RAM block 30 relative to one another. Stored values are retrieved from the RAM block seriatim, one at a time, and the scaling circuitry serves to weight each value relative to other stored values previously retrieved or later retrieved from the RAM block 30. The divider circuitry 46 serves to scale the contents of the accumulator 44 relative to the contents of the register 42 so as to weight these contents differently. Dividing the contents of the accumulator register 44 by two has the effect of decreasing the magnitude of the accumulator contents relative to the contents of register 42 by a factor of two. Considered from another point of view, such dividing has the effect of increasing the magnitude of the contents of register 42 by a factor of two relative to the contents of the accumulator register 44. Alternatively, an equivalent scaling result can be achieved by using multiplier circuitry (not shown) to the multiply the contents of the input register 42 by two. Thus, the scaling circuitry scales the relative magnitudes of the input register 42 and the accumulator register 46.

In the illustrated embodiment, each of the registers 34-1 to 34-16 stores and shifts one bit of data at a time. A total of sixteen bits of data can be stored in the shift register 34 at any given moment. The shift register 34 is implemented to serially shift (one bit at a time) data, from left to right in the drawing, from register 34-1 to 34-16. For example, fifteen shifts are required to shift one bit of data located in first register 34-1 to the sixteenth register 34-16; upon occurrence of a sixteenth shift, that data bit is shifted out of the sixteenth register 34-16. It will be appreciated that new data bits can be added to the first register 34-1 as bits are shifted through the register 34 so as to keep the register 34 filled with data bits at all relevant times. Also, it will be understood that shift register 34 may be a segment of a larger register, and that the first register 34-1 receives data bits from another upstream register (not shown) while the sixteenth register 34-16 shifts data bits to another downstream register (not shown).

The tap outputs 36-1 to 36-4 are spaced apart from each other by a prescribed number of intervening registers apiece. In a present embodiment, the prescribed number is four. For example, the first tap output 36-1 is spaced apart from the second tap output 36-2 by four registers, specifically, the fifth through eighth registers 34-5 to 34-8. This spacing of tap outputs is selected during the programming of the first programmable logic circuitry 31 so as to implement a desired sampling strategy. The filter embodiment of FIG. 4 evaluates one 4-bit sample at a time. The four output taps 36-1 to 36-4 provide access to respective bits of different respective 4-bit data samples within the shift register. More specifically, multiple 4-bit data samples are loaded within the shift register at any given time. Data bits are shifted into the shift register separately, one bit at a time. A first 4-bit sample is shifted in first followed in order by the second, third and fourth 4-bit samples. As a result, a fourth four-bit sample is provided in the first through fourth registers 34-1 to 34-4. A third four-bit sample is provided in the fifth through eighth registers 34-5 to 34-8. A second four-bit sample is provided in the ninth through twelfth registers 34-9 to 34-12. A first four-bit sample is provided in the thirteenth through sixteenth registers 34-13 to 34-16.

The 4-bit samples are shifted into the shift register 34 one sample at a time with a least significant bit (LSB) being loaded first and a most significant bit (MSB) being loaded last for each sample. Thus, when all four samples have been loaded into the sixteen registers 34-1 to 34-16, register 344 holds the LSB of a fourth sample; register 34-8 holds a LSB of a third sample; register 34-12 holds a LSB of a second sample; and register 34-16 holds a LSB of a first sample.

Therefore, the fourth output tap 36-4 provides access to the LSB of the first sample; third output tap 36-3 provides access to the LSB of the second sample; second output tap 36-2 provides access to the LSB of the third sample; and first output tap 36-1 provides access to the LSB of the fourth sample.

FIG. 5 illustrates the contents of one look-up table stored in the RAM block 30. In the illustrated embodiment, the multi-bit address input 32 of RAM block 30 includes four address pins A4-A1 used to address sixteen storage locations 0000 to 1111. Each respective storage location stores a respective value. In the filter embodiment of the invention, each value represents a mathematical result determined based upon a mathematical operation involving the bit values of the address of the storage location containing that value and at least one other value. In a current embodiment the mathematical determination involves multiplication and is represented by the following relationship.

$$\text{Stored Value} = A4(C3) + A3(C2) + A2(C1) + A1(C0)$$

Thus, in that embodiment each storage location stores a result representing a sum of a multiplication of address bit A4 on tap the first output 36-1 multiplied by C3, plus a multiplication of address bit A3 on tap second output 36-29 by C2, plus a multiplication of address bit A2 on tap third output 36-3 by C1, plus a multiplication of address bit A1 on tap fourth output 36-4 by C0. Thus, coefficients C0-C3 represent factor values multiplied by address bit values to determine the contents of the storage locations of the RAM block 30. For example, as shown in FIG. 5, storage location 0000 stores value 0. Storage location 0001 stores value C0. Storage location 0010 stores C1. Storage location 1001 stores C3+C0. Storage location 1101 stores C3+C2+C0. Storage location 1111 stores C3+C2+C1+C0.

For example, the fourth tap output 36-4 is coupled to the most significant address bit A4 of the address input 32. In the illustrated embodiment the stored pre-computed mathematical value includes a term, A4(C3), that represents the multiplication of C3 by the first sample LSB value applied by the fourth tap output 36-4 to the most significant address bit A4. Hence, for each storage location for which the most significant address bit is 0, C3 is multiplied by 0. For each storage location for which the most significant address bit is 1, C3 is multiplied by 1. In other words, since the fourth output tap 36-4 determines the value applied to the most significant address bit A4, it also determines the C3 component of the value retrieved from the RAM block 30 at each storage location. If the fourth output tap and the A4 value is 0, then the C3 contribution to the stored value at the addressed location is 0. If the fourth output tap and the A4 value is 1, then the C3 contribution to the stored value at the addressed location is C3.

In essence, the RAM block 30 serves as a multiplier of coefficient values by tap output values. More specifically, the RAM block 30 serves as a table that stores pre-computed values determined by mathematical combinations of possible shift register contents and other factor values. In the illustrated example, the other factor values include C0-C4. The RAM block 30 stores the pre-computed results of multiplication operations involving all possible combinations of tap output values and coefficient values according to the above equation. Since the tap output values are coupled to the address inputs 32 of the RAM block 30, the tap values determine which storage location of the RAM block is accessed for the retrieval of a stored pre-computed value.

In operation, the individual storage locations of RAM block 30 are encoded with pre-computed values derived from individual storage addresses and at least one other factor. In a present embodiment, the at least one other factor includes one of several different coefficient values. Each address bit of a storage location's address is multiplied by one of the coefficient values, and the products of such multiplication for all address bits are summed to produce a pre-computed value for that storage address. It will be appreciated that other computations can be used to derive the pre-computed values consistent with the invention. As data bits are shifted through shift register 34, tap outputs 36-1 to 36-4 are provided as address bit inputs A4 to A1 so as to address corresponding storage locations in the RAM block 30. Since bits are shifted sequentially through the shift register 34, a sequence of addresses is provided by tap outputs 36-1 to 36-2. Each one-bit shift results in a new address combination. Stored pre-computed values are retrieved from the RAM block 30 or 30' in response to addresses presented by the output taps. The details of the control signals used to read stored data from the RAM block are not described herein since they form no part of the present invention and will be readily understood by persons of ordinary skill in the art. However, it is worth noting that there is no requirement that every address presented by the output taps 36-1 to 36-4 is used retrieve a stored value. In other words, for example, it is within the scope of the invention to retrieve every other storage location presented by the output taps. This would correspond to retrieving a pre-computed value for every other one-bit shift within the shift register 34.

The retrieved values are presented one at a time as input to the input register 42 of the MAC circuitry 38. In a present embodiment, the retrieved values are input to the input register 42 in the sequence in which they are retrieved from the RAM block 30. Each value input to the input register 42 is provided to adder 40 which adds the input value to a quotient resulting from a divide-by-two operation performed by divider 46 upon the contents of the accumulator register 44. The division operation scales the magnitude of the currently stored value in the accumulator register 44 relative to a magnitude of the currently stored value in the input register 42. Scaling using a division operation on the accumulator register contents has the effect of increasing the magnitude of the contents of the accumulator register 44 relative to the contents of the input register 42. As a result of this scaling operation, each value retrieved from the storage block 30 or 30' is increased by a power of two relative to the current value in the accumulator register 44. The two values as scaled are added together by adder 40 to produce a new accumulator value on line 50 that is stored in the accumulator register 44. This retrieval and accumulation cycle repeats until all bits of a prescribed sample have been processed. The cycle then repeats for a next set of samples. Thus, in the example embodiment of FIG. 4, after four cycles, an output on line 52 represents an evaluation result. Following presentation of the evaluation result, the accumulator register 44 is cleared to zero, and another four samples can be evaluated to a next evaluation result.

Moreover, the first port can be used to access one storage location of RAM block 30 while the second port is used to update another storage location of the RAM block 30. More specifically, address signals provided on input 32 by the shift register taps (A1-A4) via the first address registers AR1 address individual storage locations, and data stored at an addressed location is read out and provided to the MAC circuitry 38 via the first data registers DR1. At the same time, data at another location of the RAM block 30 can be updated via second address registers AR2 and the second data registers DR2 of the second port.

FIG. 6 shows two coefficient look up tables stored simultaneously in the multi-port RAM block 30 in accordance with one embodiment of the invention. In the course of an on-the-fly update to coefficients used in a multiplication operation, multiple coefficient look up tables can be stored in the multi-port RAM block 30. Two are shown in FIG. 6. In one embodiment, one table is operational in the multiplication process, while the other table is updated. The first port (AR1, DR1) accesses the contents of one table, while the second port (AR2, DR2) accesses the contents of the other table. The two tables can reverse roles when the second port finishes a round of updating. In other words, the first port receives address signals provided on tap lines 36-1 to 36-4 to AR1, retrieves the contents of storage locations of the one table addressed by the address signals, and provides the retrieved contents via DR1 as output to input register 42. Meanwhile, at the same time, the second port can receive address signals via AR2 and update data via DR2. The second port writes the received data to the other table. Once the other table has been updated, the roles of the two tables can be reversed. The other table becomes the operational table, receiving tap inputs 36-1 to 36-4 via the first port, while the one table is updated via the second port. This operational/updating role reversal process can continue throughout the multiplication operation so that the coefficients can be adapted continually in real time without interruption of the multiplication operation.

FIG. 6 shows an example in which a first look up table occupies storage locations 00000 through 01111 and a second table occupies storage locations 10000 through 11111. The first table, for example, includes coefficient 0 at address location 00000, coefficient D2+D1 at location 00110 and coefficient D3+D2+D1+D0 at location 01111. The second table, for example, includes coefficient 0 at address location 10000, coefficient F2+F1 at location 10110 and coefficient F3+F2+F1+F0 at location 11111. In operation, MSBs of the address signal inputs to AR1 and AR2 determine which table is accessed by which port. For instance, if the MSB of AR1 is set to 0 while the MSB of AR2 is set to 1, then the first port can access the first table while the second port can access the second table. In this first state, the first table would be operational while the second table is updated. Once the second table has been updated, the MSB of AR1 can be set to 1 and the MSB of AR2 can be set to 0 so as to reverse the roles of the two tables. In this second state, the first port can access the second table while the second port can access the first table. In this second state, the second table would be operational while the first table is updated.

Alternatively, the RAM block can retrieve data (e.g., coefficients) from one table for use in a multiplication process while simultaneously updating that same table. For example, referring to the illustrative table shown in FIG. 5, in this alternative mode of operation, the first port can be used to access storage location 0011 in order to read the value C0+C1 stored there, while the second port is used to concurrently access storage location 1101 in order to write a new value into that location to update the value C3+C2+C0 previously stored there. Address contention logic can be used to manage attempts at simultaneous accesses to the same storage location of the table by the two ports.

Address Control circuitry (not shown) regulates the transfer of data through the first and second ports. For example, in an embodiment of the RAM block that includes multiple tables, as shown in FIG. 6, that alternate between serving as the operational table accessed through the first port, and the update table accessed through the second port, the address control circuitry may include circuits that toggle the MSB address signals between 0 and 1, when the update table has been updated. More specifically, when the second table is updated, the address control circuitry provides read access to the first table via the first address registers and the first data registers of the first port, and concurrently provides write access to the second table via the second address registers and the second data registers of the second port. Conversely, when the first table is updated the address control circuitry provides read access to the second table via the first address registers and the first data registers of the first port, and concurrently provides write access to the first table via the second address registers and the second data registers of the second port. Alternatively, when a single table, such as the table shown in FIG. 5, serves both as the operational and update table, the address control logic may serve an address contention role to avoid data access collisions (simultaneous reads and writes at the same table location). More particularly, the address control circuitry in such alternative embodiment provides read access to one storage location of the look up table via the first address registers and the first data registers of the first port while concurrently providing write access to another storage location of the one look up table via the second address registers and the second data registers of the second port. The Address Control circuitry may be implemented by programming of third programmable logic (elements) or it may be implemented using dedicated logic.

FIG. 7 is an illustrative drawing of another embodiment of the invention in which an evaluation result is derived through access to multiple RAM blocks 130-1 and 130-2. In the interest of avoiding a duplicative description, items in FIG. 7 that are identical to corresponding items of FIG. 4 are labeled with a three digit numeral in which the last two digits are the same as the two digits identifying the corresponding item in FIG. 4.

The embodiment of FIG. 7 comprises a system 70 implementing distributed arithmetic based soft multiplier operations. The system includes first and second multi-port RAM blocks 130-1 and 130-2 that include respective first and second multi-bit address inputs 132-1 and 132-2 and respective first and second multi-bit RAM block outputs 133-1 and 133-2. A first shift register portion 134-1 includes sixteen individual registers that can hold four 4-bit samples in four sets of four registers 134A to 134D. A second shift register portion 134-2 includes sixteen individual registers that can hold four 4-bit samples in four sets of four registers 134E to 134H. In the illustrative drawings of FIG. 6, the first and second register portions 134-1 and 134-2 are shown to be different portions of the same register interconnected so that the output of the LSB register of register set 134D feeds directly to the MSB register of register set 134E. However, in an alternative embodiment (not shown) the first and second register portions 134-1 and 134-2 may be portions of different registers in which the first and second portions 134-1 and 134-2 are not interconnected.

The system also includes RAM block output adder circuitry 72 coupled to receive as input the first and second multi-bit RAM block outputs 133-1 and 133-2. MAC circuitry 138 includes accumulator adder circuitry 140, a multi-bit input register 142 coupled to the multi-bit output of RAM block output adder 72 and also includes an accumulator register 144 for storing accumulation results output by the RAM block adder 140. Divider circuitry 146 is used to scale the value stored in the accumulator register 144.

The first and second shift register portions 134-1 and 134-2 are implemented in first programmable logic circuitry. The RAM block output adder 72 is implemented in second programmable logic circuitry. The scaling accumulator is implemented in third programmable logic circuitry 137. Alternatively, the first and second shift register portions 134-1 and 134-2 can be implemented using respective write registers (not shown) of the first and second RAM blocks 130-1 and 130-2.

Operation of the first and second multi-port RAM blocks 130-1 and 130-2, of the first and second shift register portions 134-1 and 134-2 and of the MAC circuitry 138 will be understood from the above description of the embodiments illustrated in FIGS. 3-6. The role of the RAM block output adder 72 is to add the outputs from the first and second RAM blocks 130-1 and 130-2 and to provide their sum to the input register 142 of the MAC circuitry 138. The embodiment of FIG. 7, for example, may be useful in FIR filter applications in which the number of output taps exceeds the number of address bit input lines of a single RAM block. Moreover, it will be understood that the system 70 of FIG. 7 can be extended to include additional RAM blocks (not shown) that are interconnected by implementing the RAM block output adder 72 as an adder tree circuit with enough inputs to receive an output from the additional RAM blocks (not shown). Moreover one storage location of RAM block 130-1 can be updated while another storage location of RAM block 130-1 is simultaneously accessed to retrieve a coefficient for use in a multiply operation. Similarly, one storage location of that same RAM block 130-2 can be updated while another storage location of that same RAM block 130-2 is simultaneously accessed to retrieve a coefficient for use in a multiply operation.

A second mode of using soft multipliers is shown in FIG. 8. In a second mode of soft multipliers in accordance with the present invention, a calculation can be carried out using RAM blocks in parallel. FIG. 8 is a block diagram of a calculation circuit 210 illustrating a method and apparatus for implementing parallel soft multiplication in accordance with the present invention. Various aspects of the operation of calculation circuit 210 will be understood from the above description of the embodiments illustrated in FIGS. 3-7. Calculation circuit 210 includes three, 16×16 RAM blocks 212-1, 212-2 and 212-3. A 16×16 RAM block indicates that the block has 16 addresses with 16 bits per address. The output of first RAM block 212-1 drives a first input to first adder 214. The output of second RAM block 212-2 is passed through a first shift-by-4 capability before driving a second input to first adder 214. First Shift-by-4 operation 216 shifts the output of second RAM block 212-2 by 4 bits and is preferably accomplished by shifting the output bus of second RAM block 212-2 4 places when making a connection to the second input of adder 214. An output of first adder 214 drives an input of second adder 222. An output of third RAM block 212-3 drives a staging register 218, which acts to synchronize the output of third RAM block 212-3 with the outputs of first RAM block 212-1 and second RAM block 212-1. The output of stating register 218 is passed through a second shift-by-4 capability before driving and input of second adder 222. Staging register 218, shift-by-4 operations 216 and 220, and adders 214 and 222 are preferably implemented in programmable logic circuitry 211.

The input of calculation circuit 210 is a 12 bit bus 232 carrying a 12 bit word 230 shown in FIG. 8 using the notation [11 . . . 0], where 0 indicates the LSB and 11 indicates the MSB. 12 bit bus 232 is separated into 3 4 bit busses 232-1, 232-2 and 232-3. Bus 232-1 is the portion of bus 232 carrying the 4 LSBs [3 . . . 0] of word 230, bus 232-3 is the portion of bus 232 carrying the 4 MSBs [11 . . . 8] of word 230 and bus 232-2 carries the remaining 4 middle bits [4 . . . 7] of word 230. The 4 LSBs [3 . . . 0], the four middle bits [4 . . . 7] and the four MSBs [8 . . . 11] can be fed into each RAM block 212-1, 212-2 and 212-3, respectively, simultaneously, that is, on the same clock cycle.

As explained further below, each RAM block 212-1, 212-2 and 212-3 is configured to provide an output that represents the multiplication of the 4 bit inputs on busses 232-1, 232-2 and 232-3, respectively, by a 12 bit predetermined multiplicand. As noted above, the result of this operation from first RAM block 212-1 is fed into first adder 214 along with the result of the multiplication from second RAM block 212-2 shifted by 4 bits. This shifting is necessary because the output of second RAM block 212-2 is a multiplication of the 4 middle bits [4 . . . 7] of word 230, which are shifted by 4 bits from the 4 LSBs [3 . . . 0] of word 230. FIG. 9 illustrates the shifting of the output of a 16 output RAM block, such as second RAM block 212-2, by 4 bits with respect to the output of another 16 output RAM block, such as first RAM block 212-1. Unshifted output 240 represents the 16 bit output of RAM block 212-1 and shifted output 242 represents the output of second RAM block 212-2 shifted by 4 bits. As shown shifted output 242 is shifted by 4-bits in the direction of the MSB of unshifted output 240 and 0s are effectively placed in the first four LSB positions of shifter output 242. This is how the 16 bit outputs of first RAM block 212-1 and second RAM block 212-2, respectively, are fed into first adder 214. As noted above, this can be accomplished by physically shifting the 16 bit output bus of second RAM block 212-2 by 4 bits when connecting the output bus to the input of first adder 214. Specifically, adder 214 is preferably a 20 bit input adder, the 16 bits of an input bus carrying 16 bit input word 240 are connected to the 16 MSB inputs of the 20 bit adder input. As explained above, the output of staging register 218 is shifted by 8 bits. This is preferably accomplished in the same manner shown in FIG. 9 and discussed above with respect to the output of second RAM block 212-2. Shift operations such as shift operations 216 and 220 can also be accomplished in any other manner. The shifted output of second shift-by-4 operation 220 is added to the output of first adder 214 by second adder 222. The output of second adder 222 is the output of calculation circuit 210.

As discussed above with respect to 4-tap filter 28 in FIG. 3 through FIG. 5, the multiplication function is implemented in RAM blocks 212-1, 212-2 and 212-3 by configuring LUTS therein. Specifically, FIG. 10 is a diagram showing a LUT 245 that could be configured in each RAM block 212-1, 212-2 and 212-3 to carry out the 4×12 multiplication function performed thereby. In the illustrated embodiment, a multi-bit address input of each RAM block 212-1, 212-2 and 212-3 includes four address pins used to address sixteen storage locations 0000 to 1111. Each respective storage location stores a respective value. By configuring RAM blocks 212-1, 212-2 and 212-3 with LUT 245, the input on the address register of the respective RAM block is multiplied by the corresponding multiple of the 12 bit coefficient C. For example, in the address register on an given RAM block is driven with 0011, then the output of the RAM block will be 3C. In general, in the embodiment shown in FIG. 10, the output of a RAM block will be given by:

Stored Value=AC

Where A is the 4 bit address input to the RAM block and C is the 12 bit coefficient. Other configurations of RAM blocks 212-1, 212-2 and 212-3 are also considered. Additionally, it is not necessary that RAM blocks 212-1, 212-2 and 212-3 include the same LUT configuration or use the same coefficient as discussed above. Specifically, RAM blocks 212-1, 212-2 and 212-3 could each use a difference multiplication coefficient. Further, as will be discussed below, it is considered that fewer or greater that 3 RAM blocks be used in a calculation circuit in accordance with the present invention. Also, it is considered that RAM blocks used in a calculation circuit in accordance with the present invention be other that 16×16 blocks, other size memory block configurations are also within the ambit of the present invention.

Because calculation circuit 210 splits its 12 bit input into 34 bit input RAM blocks, calculation circuit 210 can carry out a complete 12×12 multiplication in a single clock cycle. This can advantageously provide faster operation of a PLD in which a calculation circuit such as calculation circuit 210 is used. Additionally, calculation circuit 210 can carry out a complete 12×12 multiplication without the accumulator circuitry 38 of 4-tap filter 28 illustrated in FIG. 4.

FIG. 11 is a functional diagram showing another embodiment of a multiplier circuit 310 in accordance with the present invention. As discussed above with respect to RAM block 30 shown in FIG. 3, two coefficient LUTs may be stored simultaneously in a multi-port RAM block. As discussed above with respect to FIG. 6, in one embodiment, one table is operational in the multiplication process, while the other table is updated. The first port accesses the contents of one table, while the second port accesses the contents of the other table. The two tables can reverse roles when the second port finishes a round of updating. The embodiment of FIG. 11 implements this use of two LUTs stored simultaneously in a multi-port RAM block in the context of parallel multiplication discussed above with respect to FIGS. 8-10.

FIG. 11 illustrates a 12×12 multiplier utilizing only a single multi-port RAM block 312. For simplicity, FIG. 11 illustrates RAM block 312 in two parts, a first port 312a and a second port 312b, though RAM block is physically unitary. As discussed above with respect to RAM block 30 shown in FIG. 3, first port 312a includes a first address register A312a and first data register D312a. Similarly, second port 312b includes a second address register A312b and a second data register D312b. The total size of RAM block 312 is 64×18 in order to accommodate configuration of two LUTs therein, as discussed below. The output of first port 312a drives a first input to adder 316. The output of second port 312b drives a shift-by-6 operation 314, the output of which drives a second input to adder 316. A 12 bit bus 332 is split into two a first 6 bit bus 332-1 and a second 6 bit bus 332-2 to drive calculation circuit 310. 6 bit bus 332-1 drives first port 312a with the LSBs of 12 bit operand 330 and 6 bit bus 332-2 drives second port 312b with the MSBs of 12 bit operand 330.

FIG. 12 illustrates first and second LUTs 345a and 345b that could be configured in RAM block 312. LUT 345a represents a configuration that could be generated by port 312a and LUT 345b represents a configuration that could be generated by port 312b. Specifically, if the address on first address register A312a is 000000, 000001, 000010 or 000100, then the output on first data register D312a is 0, Ca, 2Ca, 3Ca or 4Ca, respectively, where Ca is a 12 bit coefficient. Also, if the address on first address register A312a is 000000, 000001, 000010 or 000100, then the output on second data register D312b is 0, Cb, 2Cb, 3Cb or 4Cb, respectively, where Cb is a 12 bit coefficient. It is considered that Ca may either equal Cb or be different from Cb.

In operation, first address register A312a receives the 6 LSBs of 12 bit operand 330 as address signals provided on 6-bit bus 332-1, retrieves the corresponding contents of storage locations of LUT 345a, and provides the retrieved contents via first data register D312a as output to adder 316. Meanwhile, at the same time, second address register A312b can receive address signals via 6-bit bus 332-2 and update data via a data input line (not shown). Second address register A312b writes the received data to LUT 345b. Once LUT 345b has been updated, the roles of LUT 345a and LUT 345b can be reversed. Specifically, LUT 345b becomes the operational table, receiving the 6 MSBs of 12 bit operand 330 via 6-bit address bus 332-2, while LUT 345a is updated via address register A312a. As discussed above, this operational/updating role reversal process can continue throughout the multiplication operation so that the coefficients can be adapted continually in real time without interruption of the multiplication operation.

As discussed above with respect to FIG. 6, it is possible to have the MSBs of the address inputs on address registers A312a and A312b determine whether LUT 345a or LUT 345b is accessed. Also as discussed above, RAM block 312 can alternatively retrieve data (e.g. coefficients) from one LUT for use in a multiplication process while simultaneously updating that same LUT. For example, referring to illustrative LUT 345a shown in FIG. 12, in this alternative mode of operation, the first address register A312a can be used to access storage location 000011 in order to read the value 3Ca stored there, while the second address register A312b is used to concurrently access storage location 000001 in order to write a new value into that location to update the value Ca previously stored there. Address contention logic can be used to manage attempts at simultaneous accesses to the same storage location of the table by the two ports. Also in the manner discussed above with respect to RAM block 30 and the multiple tables shown in FIG. 6, Address Control circuitry (not shown) can be used to regulate the transfer of data through the first and second ports of multi-port RAM block 312.

Though calculation circuit 310 illustrated in FIG. 11 includes on a single multi-port RAM block 312, it is considered that multiple multi-port RAM blocks be included in a calculation circuit carrying out a parallel soft multiplication function in accordance with the present invention. For example, each RAM block 212-1, 212-2 and 212-3 of calculation circuit 210 illustrated in FIG. 8 could be a multi-port RAM block. This would allow variable coefficients to be used.

By using multi-port RAM blocks in calculation circuits in accordance with the present invention, either variable coefficients may be implemented or fewer numbers of RAM blocks may be used to implement the same functionality. For example, with respect to LUTs 345a and 345b of calculation circuit 310, if coefficients Ca and Cb are equal, then calculation circuit 310 is a 12×12 multiplier using only a single RAM block. However, if coefficients Ca and Cb are different, then variable coefficients may be implemented.

Another architecture that may be used to reduce the number of RAM blocks necessary to carry out a particular multiplication is illustrated in FIG. 13. FIG. 13 is a block diagram of an 18×18 calculation circuit 410 that carries out a semi-parallel mode of soft multiplication in accordance with the present invention. Calculation circuit 410 includes a 64×24 RAM block 412. The output of RAM block 412 drives a first input to adder 416. The output of adder 416 drives a shift-by-6 operator 414 which, in turn, drives a register 418. As discussed above with respect to shift-by-4 operation 216 of calculation circuit 210 shown in FIG. 8 and FIG. 9 and shift-by-6 operation 314 of calculation circuit 310 shown in FIG. 11, shift-by-6 operation 414 can be accomplished by physically shifting the 35 bit output bus of adder 416 by 6 bits when connecting the output bus to the input of adder 416. Register 418 drives a second input to adder 416. Also, adder 416 drives an output register 420.

The input to calculation circuit is a 18-bit bus 432 carrying 18-bit operand 430 and which is split into three 6-bit busses 432-1, 432-2 and 432-3. First 6-bit bus 432-1 carries the 6 LSBs of 18-bit operand 430, second 6-bit bus 432-2 carries the middle 6 bits of 18-bit operand 430 and third 6-bit bus 432-3 carries the 6 MSBs of 18-bit operand 430. First 6-bit bus 432-1 drives a first shift register 450-1, second 6-bit bus 432-2 drives a second shift register 450-2 and third 6-bit bus 432-3 drives a third shift register 450-3. Shift registers 350-1, 350-2 and 350-3 each have two modes; a shift mode activated by a shift input and a load mode activated by a load input. Shift registers 350-1, 350-2 and 350-3 each hold a 6-bit word and when shifted, shift the entire 6-bit word through a respective output. Additionally, shift registers 450-1, 450-2 and 450-3 are interconnected such that when shifted, the 6-bit word in third shift register 350-3 will be shifted into second shift register 350-2 and 6-bit word in second shift register 350-2 will be shifted into first shift register 350-1. The output of first shift register 350-1 drives the input of RAM block 412 such that when shifted, the 6-bit word in first shift register 350-1 is input into a 6-bit address of RAM block 412. In load mode, shift registers 350-1, 350-2 and 350-3 load the 6-bit words on 6-bit busses 432-1, 432-2 and 432-3, respectively.

Calculation circuit 410 is driven by two clock cycles; a slow clock Clk and a fast clock 3Clk. As implied by the notation, fast clock 3Clk preferably runs at approximately 3 times the frequency of slow clock Clk. Fast clock 3Clk drives the shift inputs of shift registers 350-1, 350-2 and 350-3 and slow clock Clk drives the load inputs thereof. Additionally, slow clock Clk drives output register 420 and fast clock 3Clk drives register 418.

As discussed above with respect to RAM blocks 212-1, 212-2 and 212-3 shown in FIG. 8 and RAM block 312 shown in FIG. 11, RAM block 412 is preferably configured with one or more LUTs such that a 6 bit operand can be multiplied by a 18 bit coefficient in a single clock cycle. RAM block 412 can contain 2 LUTs such that a multiplication may use 2 different coefficients in a manner discussed above with respect to RAM block 312 shown in FIG. 11. In operation, RAM block 412 provides one 6×18 bit multiplication result per fast clock 3Clk cycle to adder 416. Thus, after one cycle of slow clock Clk, a full 18×18 multiplication result can be provided. On a first cycle of slow clock Clk, the 6 LSBs of operand 430 are loaded into shift register 450-1, the 6 middle bits of operand 430 are loaded into shift register 450-2 and the MSBs of operand 430 are loaded into shift register 450-3. Then, 6 bits at a time on the subsequent 3 cycles of fast clock 3Clk, 18 bit operand 430 is shifted through shift register 450-1 into RAM block 412. On each cycle of fast clock 3Clk, RAM block 412 provides an evaluation result of a 6×18 multiplication to adder 416. The output of adder 416 is fed back into shift-by-6 operator 414, which shifts the input 6 bit word to the left by 6 bits, and passed through register 418 into a second input of adder 416. Additionally, the output of adder 416 is fed into output register 420 which accumulates a partial 6×18 multiplication result on each cycle of fast clock 3Clk. Output register 420 provides a full 18×18 multiplication result on each cycle of slow clock Clk. Because calculation circuit 410 completes a full 18×18 multiplication using only a single RAM block, it can be relatively more resource efficient when used in a PLD. However, because additional clock cycles are required to complete the multiplication, use of a circuit such as calculation circuit 410 may be relatively slower.

FIG. 14 illustrates a further embodiment of a calculation circuit using a memory block in accordance with the present invention. FIG. 14 is a block diagram of a calculation circuit 510 including a RAM block 512 for carrying out a 16×15 bit multiplication. In particular, the input operand to calculation circuit 510 is preferably 16 bit and a coefficient by which calculation circuit 510 multiplies the input operand is preferably 15 bit. In addition to RAM block 512, calculation circuit 510 includes a register 514 that is driven by the output or RAM block 512, and an adder 516, a first input of which is driven by the output of register 514. The output of Adder 516 drives an shift-by-2 operation 520. The output of output is both provided as an output to calculation circuit 510 and feedback into a second input of adder 516.

In the embodiment shown in FIG. 14, the input to RAM block 512 includes two, 2-bit input lines 532-1 and 532-2 merged into a single 4-bit input line 534. Input line 532-1 includes 8, 2-bit shift registers 550-1 through 550-8 and input line 552-2 includes 8, 2-bit shift registers 550-1 through 550-8. Input lines 532-1 and 532-2 each carry 16 bits operands. Input line 532-1 preferably provides the two LSBs to input bus 534 and input line 532-2 preferably provides the two MSBs to input bus 534.

As discussed above with respect to RAM blocks 30, 130, 212, 312 and 412, RAM block 512 is configured to include a LUT 545 that provides a value of a predetermined calculation based on the input on the address register of RAM block 512. In the embodiment shown in FIG. 14, the calculation involves two coefficients Ci and Cq. In particular, the calculation implemented by LUT 545 is given by:

$$\text{Stored Value} = Ci(2\text{LSBs}) + Cq(2\text{MSBs})$$

Where "2 LSBs" indicates the two LSBs of the address register input of RAM block 512 and "2 MSBs" indicates the two MSBs thereof. Accordingly, for example, if the 4-bit word on input 534 is 0000, 0001, 0010, 0011, 0100 or 1111, then the data register output of RAM block 512 would be 0, Ci, 2Ci, 3Ci, Cq or 3Cq+3Ci, respectively.

This output is provided to a first input of adder 516 through register 514 which can act as a memory output register. The output of adder 516 is then fed back into a second input of adder 516 through register 520 and shift-by-2 operation 522. Shift-by-2 operation can be implemented by shifting the output of register 520 by 2 bits as discussed above with respect to FIG. 9. Because shift registers 550-1 through 550-8 and 552-1 through 552-8 shift 2 bits per clock cycle, a 16 bit input operand will require 8 clock cycles to completely multiply.

As shown in FIG. 14, one possible application of calculation circuit 510 is to multiply a complex number by a coefficient. In particular, input line 532-1 can carry the real or 'i' portion of the complex operand and input line 532-2 can carry the complex or 'q' portion thereof. A calculation circuit configured as calculation circuit 510 can be more time efficient for performing complex number multiplication than a system having a "sum of multiplications" type configuration such as 4-tap filter 28 shown in FIG. 4. Specifically, to perform the multiplication of a 16 bit complex number by a 15 bit coefficient, as noted above, calculation circuit 510 requires 8 clock cycles. However, a calculation circuit such as 4-tap filter 28 shown in FIG. 4 configured to carry-out the same calculation would require 16 clock cycles. Additionally, a calculation circuit configured as calculation circuit 510 can carry out a complex number multiplication in a more space efficient manner that a calculation circuit have a "semi-parallel" type configuration such as calculation circuit 410 shown in FIG. 13. Specifically to perform the multiplication of a 16 bit complex number by a 15 bit coefficient, as discussed above, calculation circuit 510 requires only a single RAM block. However, calculation circuit 410 shown in FIG. 13 configured to carry-out the same multiplication would require 2 RAM blocks.

Various modifications to the preferred embodiments can be made without departing from the spirit and scope of the invention. In one alternative embodiment (not shown), for example, a tapped shift register can be implemented using some individual registers that are part of one port of a RAM block and other individual registers that are taken from programmable logic elements. In other words, such alternative embodiment would include a tapped shift register formed partially of registers from the RAM block and partially from programmable logic element registers external to the RAM block. Thus, the foregoing description is not intended to limit the invention which is described in the appended claims.

The invention claimed is:

1. A programmable logic device comprising:
   at least one RAM block generating at least a first multi-bit calculation result through a look up table; and
   a multi-bit adder coupled to an output of the at least one RAM block and which adds a shifted second multi-bit calculation result to the first multi-bit calculation result, wherein an output of the multi-bit adder drives a shift operation and the output of the shift operation is fed back into the multi-bit adder.

2. The programmable logic device of claim 1 wherein the shift operation is driven by a second multi-bit calculation result that shifts the second multi-bit calculation result by at least one bit to generate the shifted second multi-bit calculation result.

3. The programmable logic device of claim 2 wherein the at least one RAM block includes at least one lookup table (LUT) for generating the first multi-bit calculation result, and the at least one LUT includes a first LUT for generating the first multi-bit calculation result and a second LUT for generating the second multi-bit calculation result.

4. The programmable logic device of claim 3 wherein the at least one RAM block includes:
   a first input address port for inputting at least a first multi-bit word and the first LUT is configured to generate the first multi-bit calculation result the first multi-bit calculation result representing a multiplication of the first multi-bit word with at least a first predetermined coefficient; and
   a second input address port for inputting at least a second multi-bit word and the second LUT is configured to generate the second multi-bit calculation result, the second multi-bit calculation result representing a multiplication of the first multi-bit word with at least a second predetermined coefficient.

5. The programmable logic device of claim 4 wherein the second predetermined coefficient is equal to the first predetermined coefficient.

6. The programmable logic device of claim 5 wherein the first multi-bit word is input into the first input address port substantially simultaneously with the second multi-bit word being input into the second input address port.

7. The programmable logic device of claim 6 wherein the first multi-bit word is a first portion of a larger multi-bit word and the second multi-bit word is a second portion of the larger multi-bit word.

8. The programmable logic device of claim 7 wherein the at least one RAM block includes a first RAM block and a second RAM block, the first RAM block being configured with the first LUT and the second RAM block being configured with the second LUT.

9. The programmable logic device of claim 7 wherein the first LUT and the second LUT are both included in a single RAM block having the first input address port and the second input address port.

10. The programmable logic device of claim 6 wherein the number of bits the shift operator shifts the second multi-bit calculation result is equal to the number of bits in the first multi-bit word.

11. The programmable logic device of claim 2 wherein the at least one RAM block includes an address port for inputting at least a first multi-bit word and a second multi-bit word and the at least one LUT includes a single LUT configured to generate at least the first multi-bit calculation result and a preliminary second multi-bit calculation result.

12. The programmable logic device of claim 11 wherein the first multi-bit calculation result represents a multiplication of the first multi-bit word with a predetermined coefficient and the preliminary second multi-bit calculation result represents a multiplication of the second multi-bit word with the predetermined coefficient.

13. The programmable logic device of claim 12 wherein at least the preliminary second multi-bit calculation result is fed into the multi-bit adder to generate the second multi-bit calculation result.

14. The programmable logic device of claim 13 further including at least one shift register that shifts based on a clock cycle and which inputs the first multi-bit word into the address port on a first clock cycle and inputs the second multi-bit word into the address port on a second clock cycle.

15. The programmable logic device of claim 14 wherein the first multi-bit word is a first portion of a larger multi-bit word and the second multi-bit word is a second portion of the larger multi-bit word.

16. The programmable logic device of claim 15 wherein the first multi-bit calculation result represents a multiplication of the first multi-bit word with a predetermined coefficient.

17. The programmable logic device of claim 15 wherein the first multi-bit calculation result represents a multiplication of a first portion of the first multi-bit word with a first coefficient summed with a multiplication of a second portion of the first multi-bit word with a second coefficient.

18. The programmable logic device of claim 17 wherein the input to the address port of the at least one RAM block includes a multi-bit bus driven by two smaller busses, each of the smaller busses including at least one shift register.

19. The programmable logic device of claim 1 wherein the shift operation and multi-bit adder are programmed programmable logic circuitry.

20. A programmable logic device comprising:
   at least one RAM block configured with at least one LUT for generating at least a first multi-bit multiplication result;
   a shift operation driven by a second multi-bit multiplication result and that shifts the second multi-bit multiplication result by at least one bit to generate a shifted second multi-bit multiplication result; and an adder adding the first multi-bit multiplication result to the second shifted multi-bit multiplication result, wherein an output of the adder drives the shift operation and the output of the shift operation is fed back into the multi-bit adder.

21. The programmable logic device of claim 20 wherein the at least one RAM block includes at least a first LUT and a second LUT, the first LUT for generating the first multi-bit multiplication result and the second LUT for generating the second multi-bit multiplication result.

22. The programmable logic device of claim 21 wherein the at least on RAM block includes a first RAM block coupled to the adder and a second RAM block coupled to the shift operation.

23. A method of carrying out a multi-bit calculation comprising method operations of:
generating at least a first multi-bit calculation result from at least one LUT in at least one RAM block;
generating at least a second multi-bit calculation result;
shifting the at least second multi-bit calculation result by at least one bit to generate a shifted second multi-bit calculation result; and
adding the shifted second multi-bit calculation result to the first multi-bit calculation result; and
feeding back an output of the adding operation to further drive the shifting operation until all bits have been processed.

24. The method of claim 23 further including:
inputting a second multi-bit word into the at least one RAM block;
wherein configuring at least one LUT includes configuring a first LUT and a second LUT in the at least one RAM block;
generating at least a first multi-bit calculation result includes generating the first multi-bit calculation result from the first LUT; and
generating at least a second multi-bit calculation result includes generating the second multi-bit calculation result from the second LUT.

25. The method of claim 24 wherein:
generating at least a first multi-bit calculation result includes generating the first multi-bit calculation result representing a multiplication of the first multi-bit word with at least a first predetermined coefficient; and
generating at least a second multi-bit calculation result includes generating the second multi-bit calculation result representing a multiplication of the second multi-bit word with at least a second predetermined coefficient.

26. The method of claim 25 wherein the second predetermined coefficient is equal to the first predetermined coefficient.

27. The method of claim 26, further comprising:
inputting the first multi-bit word into a first input address port in the at least one RAM block substantially simultaneously with inputting the second multi-bit word into a second input address port in the at least one RAM block.

28. The method of claim 27 wherein the first multi-bit word is a first portion of a larger multi-bit word and the second multi-bit word is a second portion of the larger multi-bit word.

29. The method of claim 28 wherein:
the at least one RAM block includes a first RAM block and a second RAM block; and
configuring at least one LUT includes configuring the first LUT in the first RAM block and configuring the second LUT is the second RAM block.

30. The method of claim 28 wherein configuring at least one LUT includes configuring the first LUT and the second LUT in a single RAM block having the first input address port and the second input address port.

31. The method of claim 23 further including inputting a second multi-bit word into the at least one RAM block and wherein:
configuring at least one LUT includes configuring a first LUT in the at least one RAM block to generate at least the first multi-bit calculation result from the first multi-bit word and a preliminary second multi-bit calculation result from the second multi-bit word; and
generating at least a second multi-bit calculation result includes generating the second multi-bit calculation result from an adder which adds shifted second multi-bit calculation result to the first multi-bit calculation result.

32. The method of claim 31 wherein:
generating the first multi-bit calculation result includes generating a result that represents multiplying the first multi-bit word with a predetermined coefficient; and
generating the preliminary second multi-bit calculation result includes generating a result that represents multiplying the second multi-bit word with the predetermined coefficient.

33. The method of claim 32 further including:
shifting the first multi-bit word into an address port in the at least one RAM block on a first clock cycle; and
shifting the second multi-bit word into the address port in the at least one RAM block on a second clock cycle.

34. The method of claim 33 wherein the first multi-bit word is a first portion of a larger multi-bit word and the second multi-bit word is a second portion of the larger multi-bit word.

35. The method of claim 31 wherein:
generating the first multi-bit calculation result includes generating a result that represents a multiplication of a first portion of the first multi-bit word with a first coefficient summed with a multiplication of a second portion of the first multi-bit word with a second coefficient.

36. The method of claim 35 including driving the address port of the at least one RAM block with a bus that is driven by two smaller busses, each of the smaller busses including at least one shift register.

37. The method of claim 23 wherein the multi-bit calculation is carried out in a programmable logic device.

* * * * *